(12) United States Patent
Joye et al.

(10) Patent No.: US 9,093,696 B2
(45) Date of Patent: Jul. 28, 2015

(54) ACCUMULATOR ASSEMBLY FOR A BATTERY OF AN ELECTRIC OR HYBRID VEHICLE, PROVIDED WITH A CONNECTING STRUT

(75) Inventors: Olivier Joye, Clermont-Ferrand Cedex 9 (FR); Thierry Auguet, Clermont-Ferrand Cedex 9 (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 42 days.

(21) Appl. No.: 13/695,615

(22) PCT Filed: Apr. 18, 2011

(86) PCT No.: PCT/EP2011/056156
§ 371 (c)(1),
(2), (4) Date: Dec. 20, 2012

(87) PCT Pub. No.: WO2011/134829
PCT Pub. Date: Nov. 3, 2011

(65) Prior Publication Data
US 2013/0202947 A1 Aug. 8, 2013

(30) Foreign Application Priority Data
Apr. 28, 2010 (FR) .................................... 10 53287

(51) Int. Cl.
*H01M 2/20* (2006.01)
*H01M 2/10* (2006.01)
*H01M 10/02* (2006.01)
*H01M 10/48* (2006.01)

(52) U.S. Cl.
CPC ............ *H01M 2/202* (2013.01); *H01M 2/1077* (2013.01); *H01M 2/206* (2013.01); *H01M 10/02* (2013.01); *H01M 10/482* (2013.01); *H01M 2200/103* (2013.01)

(58) Field of Classification Search
CPC ... H01M 10/482; H01M 10/02; H01M 2/202; H01M 2/206; H01M 2/1077
USPC ......................................................... 429/158
See application file for complete search history.

(56) References Cited

U.S. PATENT DOCUMENTS

| | | | |
|---|---|---|---|
| 5,674,641 A * | 10/1997 | Cheu .............................. | 429/306 |
| 2006/0286452 A1 | 12/2006 | Takamatsu | |
| 2007/0188130 A1* | 8/2007 | Scheucher .................... | 320/110 |

* cited by examiner

*Primary Examiner* — Nicholas P D'Aniello
(74) *Attorney, Agent, or Firm* — Cozen O'Connor

(57) ABSTRACT

An accumulator assembly comprising a plurality of electrical energy accumulator elements (12) superposed on a stacking axis and each comprising connecting electrodes (18, 20), wherein it comprises at least one electrically conductive spacer (22) arranged axially between the connecting electrodes of two adjacent accumulator elements and electrically linked to at least one of said elements, and at least one connecting plug (33) mounted inside a void (30) of the conductive spacer and linked to an electric cable (31) for a voltage measurement.

15 Claims, 3 Drawing Sheets

ACCUMULATOR ASSEMBLY FOR A BATTERY OF AN ELECTRIC OR HYBRID VEHICLE, PROVIDED WITH A CONNECTING STRUT

RELATED APPLICATIONS

This is a U.S. National Phase Application under 35 USC 371 of International Application PCT/EP2011/056156 filed on Apr. 18, 2011.

This application claims the priority of French application no. 10/53287 filed Apr. 28, 2010, the entire content of which is hereby incorporated by reference.

FIELD OF THE INVENTION

The present invention relates to the field of accumulator assemblies for batteries of electric or hybrid vehicles, notably motor vehicles.

The expression "electric motor vehicle" should be understood to mean a vehicle as defined in the United Nations regulation N°100 concerning the type approval of battery-powered electric vehicles.

The present invention relates more particularly to an accumulator assembly comprising a plurality of superposed electrical energy accumulator elements and at least one connecting spacer for electrically linking the accumulator elements. A battery is formed from one or more accumulator assemblies and constitutes the electrical energy source used to power the electric or hybrid vehicle.

BACKGROUND OF THE INVENTION

The patent application WO 2005/036679 describes an accumulator assembly formed from a stack of accommodating housings containing energy accumulator elements. Each housing comprises superposed plates between which the accumulator elements are aligned in a direction perpendicular to the stacking axis of the housings. Conductive plates provide the electrical connection for the positive and negative electrodes of the adjacent accumulator elements. A printed circuit board is also arranged between the plates in order to determine the voltage and the temperature of the accumulator elements. For this purpose, the printed circuit board comprises a plurality of electric wires to be linked to each connecting electrode of the accumulator elements.

These electric wires are fixed to the connecting electrodes which are thin and fragile. Furthermore, such a fixing is generally made by soldering. These operations are relatively difficult to implement, and lengthy and costly.

Moreover, given the relative arrangement of the energy accumulator elements, the overall bulk of the assembly is relatively great.

Also known, from the patent application US 2006/0286452, is an accumulator assembly comprising a plurality of superposed electrical energy accumulator elements and in which the voltage of each accumulator element is monitored.

Also known, from the patent application WO 2007/046587, is an accumulator assembly formed from a stack of accommodating housings each containing two energy accumulator elements stacked one against the other. The housings are mounted on a common support plate comprising a plurality of omnibus bars each associated with one of the housings. Each omnibus bar comprises an electrical connection body mounted to bear against the free ends of the electrodes of the associated accumulator elements, two lugs for fixing the bar to the support plate, and an extension in extension of one of the lugs and capable of being electrically and mechanically linked to a printed circuit board. The printed circuit board makes it possible to determine the voltage of the accumulator elements connected to the associated omnibus bar.

In this document, the connecting electrodes of the accumulator elements and the corresponding omnibus bar are fixed by welding. Moreover, to make the contact between the accumulator elements and the omnibus bars, the support plate has to be provided.

In order to assemble the accumulator assembly, it is therefore necessary to perform welding operations and multiple mounting operations.

SUMMARY OF THE INVENTION

One object of the present invention is to remedy the above-mentioned drawbacks.

More particularly, one object is to provide an accumulator assembly that is easy to manufacture, to mount, to assemble and that has a reduced overall bulk.

Another object is to provide an accumulator assembly that offers good dependability.

In one embodiment, the accumulator assembly comprises a plurality of electrical energy accumulator elements superposed on a stacking axis and each comprising connecting electrodes, at least one electrically conductive spacer arranged axially between the connecting electrodes of two adjacent accumulator elements and electrically linked to at least one of said elements, and at least one connecting plug mounted inside a void of the conductive spacer and linked to an electric cable for a voltage measurement.

The arrangement of the electrically conductive spacer or spacers axially between the electrodes of the accumulator elements makes it possible to make the electrical connection of these elements with a reduced number of parts to be assembled, which favours the compactness of the accumulator assembly.

Furthermore, the void or piercing provided on the electrically conductive spacer or spacers and suitable for receiving the associated connecting plug makes it possible to produce an electrical connection in a particularly simple and rapid manner without it being necessary in particular to make connecting welds.

Advantageously, the assembly comprises a short-circuit protection means electrically linked to the connecting plug. The protection means may be mounted on the associated electric cable. Preferably, the protection means comprises a fuse or, more generally, a circuit breaker.

The end of the electric cable associated with the electric spacer or spacers is fixed to a connector to which a printed circuit board can be directly mounted to perform voltage measurements.

If the electric current passing through the electric cable is above a predetermined threshold, the protection means avoids any short circuit within the accumulator assembly that might cause a fire to start.

Moreover, in certain vehicle running conditions, the vibrations to which the accumulator assembly is subject may be relatively great. If the mechanical link between the electric cable or cables and the connector has been badly made, the end of the electric cable or cables may become detached from said connector and bear against one of the accumulator elements or against the accommodating housing inside which the accumulator assembly is mounted. The protection means also makes it possible, in this case, to avoid a short circuit within the accumulator assembly.

In one embodiment, the conductive spacer comprises a base against which bears at least one connecting electrode of the two adjacent accumulator elements, and a heel extending to protrude relative to said base and on which is formed the void. The void may extend transversely relative to the stacking axis of the accumulator elements by being parallel to a front face of the base.

In one embodiment, the connecting plug is elastically deformable, and may notably be of the banana plug type.

The assembly may comprise a plurality of electrically conductive spacers arranged axially between at least some of the connecting electrodes of the accumulator elements, and a plurality of connecting plugs each mounted inside the void of the associated conductive spacer and each linked to a specific electric cable. Each electric cable advantageously comprises a short-circuit protection means.

In one embodiment, the electrical energy accumulator elements are mounted in such a way as to alternately arrange the positive and negative connecting electrodes along the stacking axis so that a positive electrode of one accumulator element is axially adjacent to a negative electrode of an adjacent accumulator element. Insulating spacers and the conductive spacers may be arranged to connect the plurality of accumulator elements in series. The positive and negative connecting electrodes may be arranged alternately along the stacking axis from one accumulator element to another axially adjacent element.

Alternatively, it is also possible to provide a parallel mounting of the accumulator elements by respectively aligning the positive and negative electrodes along the stacking axis and by mounting the spacers appropriately.

The insulating spacers preferably comprise a base against which bears at least one electrode of two axially adjacent accumulator elements, and an extension in contact with an outer jacket of at least one of said accumulator elements. The insulating spacers may extend at least partly to protrude relative to the connecting electrodes and to the conductive spacers on the side opposite to the accumulator elements.

BRIEF DESCRIPTION OF THE DRAWINGS

The present invention will be better understood from reading the detailed description of an embodiment taken as a nonlimiting example and illustrated by the appended drawings, in which.

DETAILED DESCRIPTION OF THE INVENTION

Figure 1:
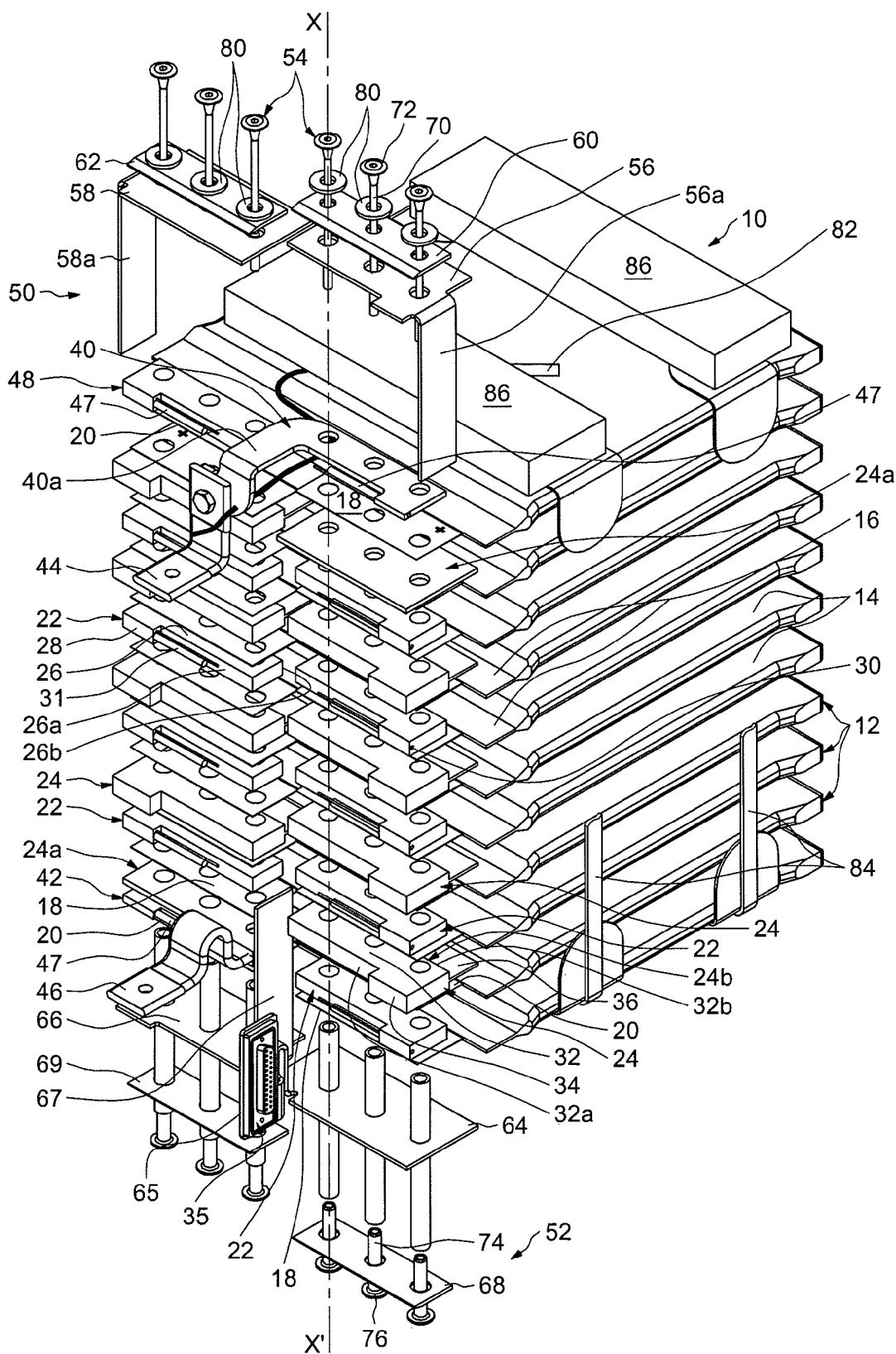
FIG. 1 is a perspective exploded view of an accumulator assembly according to an exemplary embodiment of the invention.
Figure 2:
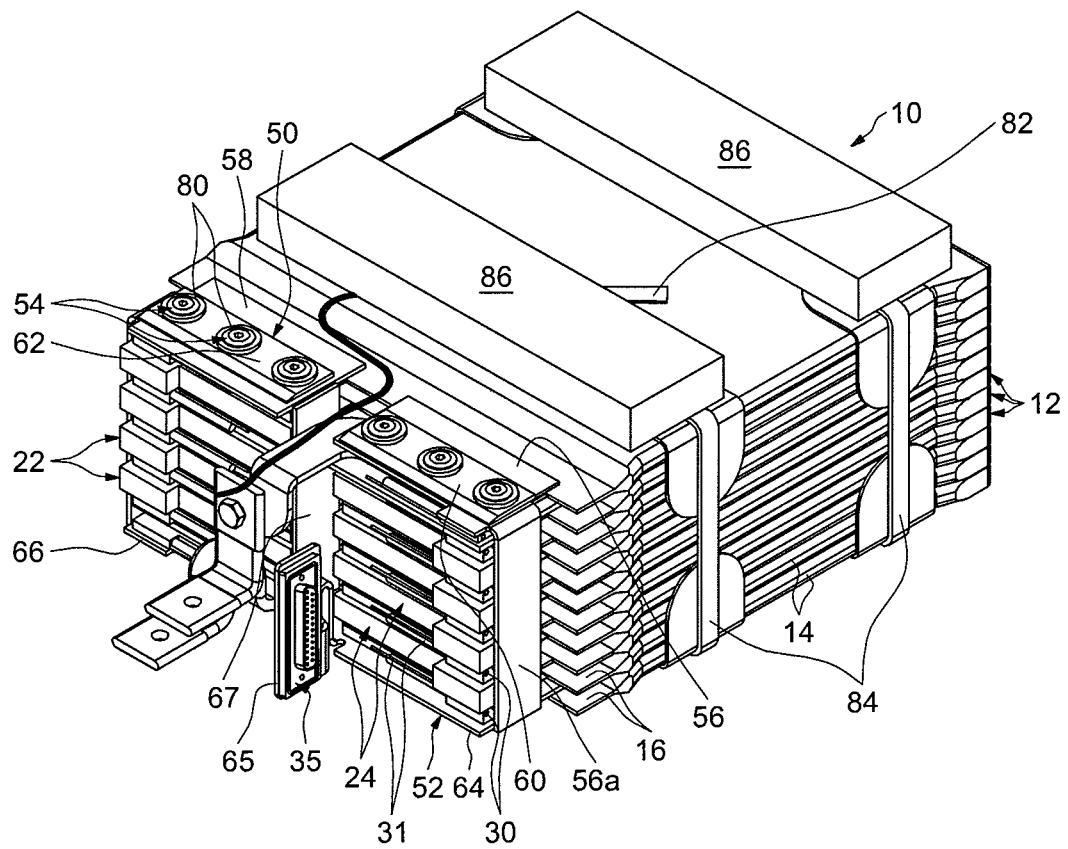
FIG. 2 is a perspective assembled view of the assembly of FIG. 1, FIGS. 3 and 4 are detail views of the assembly in the assembled position.

In FIGS. 1 and 2, an exemplary embodiment of an accumulator assembly 10 is represented which comprises a plurality of cells or electrical energy accumulator elements 12 superposed along a stacking axis X-X' which is assumed vertical.

The accumulator elements 12 are identical to one another and take a form of rectangular plates. They are stacked axially relative to one another so that the main faces of two adjacent accumulator elements are facing. In the example illustrated, the number of accumulator elements 12 is equal to eleven.

Obviously, it is possible to provide a different number of accumulator elements depending on the electrical energy to be delivered.

Each accumulator element 12 comprises an outer encapsulation jacket 14 inside which are arranged a cathode and an anode separated by an electrolyte (not represented). The electrolyte may, for example, be an aprotic electrolyte in the case of an accumulator element of lithium-ion type or else a membrane polymer separator in the case of an accumulator element of polymer lithium-ion type.

The encapsulation jacket 14 comprises a sealed closure area 16 of reduced thickness comprising a free edge from which positive 18 and negative 20 connecting electrodes extend transversely relative to the axis X-X'. The connecting electrodes 18, 20 are spaced apart transversely relative to one another. They take the form of tabs and are produced from thin metal sheets that have a thickness less than those of the closure area 16.

In the exemplary embodiment illustrated, the electrical energy accumulator elements 12 are arranged in such a way as to alternately arrange the positive 18 and negative 20 electrodes, considering the stacking axis X-X', so that the positive, respectively negative, electrode of one accumulator element is axially facing and adjacent to the negative, respectively positive, electrode of the immediately adjacent accumulator element situated below and/or above.

In order to electrically link the various accumulator elements 12, the assembly 10 comprises conductive spacers 22 and insulating spacers 24 arranged axially between the axially aligned connecting electrodes 18, 20. The spacers 22 are formed from an electrically conductive material, for example made of metallic material such as aluminium or any other appropriate material. The spacers 22 are formed from an insulating material, for example made of a synthetic material or any other appropriate material.

In the exemplary embodiment illustrated, between two axially adjacent accumulator elements 12 are arranged a conductive spacer 22 and an insulating spacer 24, apart from the upper accumulator element of the stack and the adjacent lower accumulator element. In practice, between these two elements, there is only an insulating spacer between the positive electrode 18 of the upper accumulator element 12 and the negative electrode 20 of the adjacent lower element, the other two electrodes 20, 18 of these two elements being directly in contact with one another.

The conductive spacers 22 are mounted axially between the positive electrode 18 of an accumulator element and the negative electrode 20 of the upper adjacent accumulator element. The insulating spacers 24 are mounted axially between the negative electrode 20 of an accumulator element and the positive electrode 18 of the upper adjacent accumulator element. The conductive 22 and insulating 24 spacers are arranged alternately along the axis X-X'.

By considering two adjacent accumulator elements 12, the conductive spacer 22 is mounted to bear against the upper face of the positive electrode 18 of the lower accumulator element and extends axially until it comes into contact with the lower face of the negative electrode 20 of the upper accumulator element. Conversely, the insulating spacer 24 is arranged between the upper face of the negative electrode 20 of the lower accumulator element and the lower face of the positive electrode 18 of the upper accumulator element by coming axially into contact against said faces.

In the exemplary embodiment illustrated, the connecting electrodes 18, 20 and the conductive 22 and insulating 24 spacers are arranged in such a way as to mount the plurality of accumulator elements 12 in series. As a variant, it could be possible to provide a parallel mounting of the accumulator elements. To this end, the positive and negative electrodes should be respectively aligned along the stacking axis and the spacers should be arranged appropriately.

The conductive spacers 22 are identical to one another and each comprise a base 26 taking the form of a rectangular plate and that makes it possible to electrically link the electrodes 18, 20 of two axially superposed accumulator elements 12. To this end, the lower and upper surfaces of the base 26 are in contact respectively against the positive 18 and negative 20 electrodes of these accumulator elements 12. A front face 26a of the base 26, situated on the side opposite to the accumulator elements 12, is partly extended by a heel 28. The base 26 and the heel 28 are dimensioned in such a way as to mostly cover the faces of the associated electrodes 18, 20 by remaining set back or by being flush with the peripheral edges of said electrodes. A rear face 26b of the base 26 remains at a distance from the closure area 16 of the associated accumulator elements 12.

Figure 5:
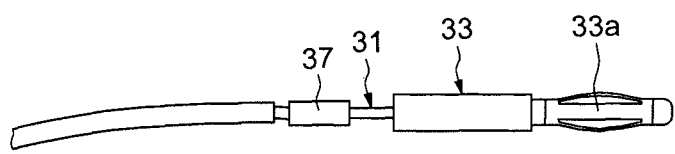
FIG. 5 is a partial view of an electric cable of the accumulator assembly of FIGS. 1 to 4.

Each spacer 22 comprises a housing or through void 30 formed in the heel 28 and extending transversely to the axis X-X' by being parallel to the front face 26a of the base 26. The void 30 of each conductive spacer 22 allows for a connecting plug 33 (FIG. 5) to be mounted at one end of an electric cable 31. Each spacer 22 therefore has an associated electric cable 31 comprising a connecting plug 33.

The connecting plug 33 of each electric cable 31 forms a male plug that can be mounted inside the associated void 30 forming a female plug. More specifically, the connecting plug 33 comprises a conductive terminal part 33a that is housed in the void 30 in order to electrically connect the cable 31 and the associated conductive spacer 22. The terminal part 33a is advantageously elastically deformable and can be fixed to the spacer 22 by pinching inside the void 30. The fixing of the connecting plug 33 to the spacer 22 can obviously be done by any other appropriate means, for example by crimping, screwing, etc. The connecting plug 33 may advantageously be of the banana plug type.

Each electric cable 31 also comprises a protective electric fuse 37 linked to the connecting plug. In the exemplary embodiment illustrated, the fuse 37 is fitted on the electric cable 31 so as to be situated in the immediate vicinity of the connecting plug 33. The fuse 37 comprises a conductive part designed to melt when the current passing through the electric cable 31 is above a predetermined threshold. The fuse may, for example, be of the ultra-fast FF type according to the international standard IEC 60127.

Figure 3:
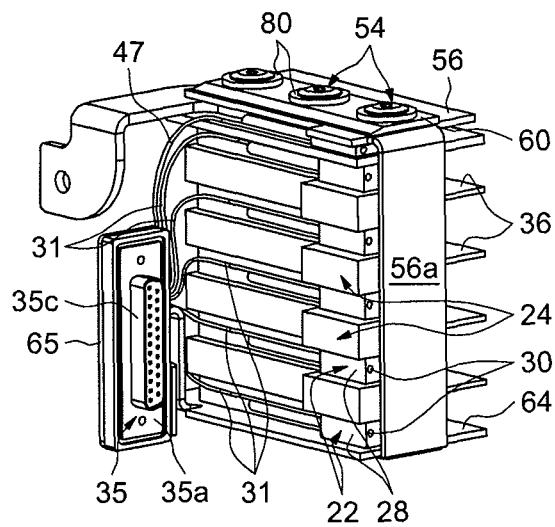
Figure 4:
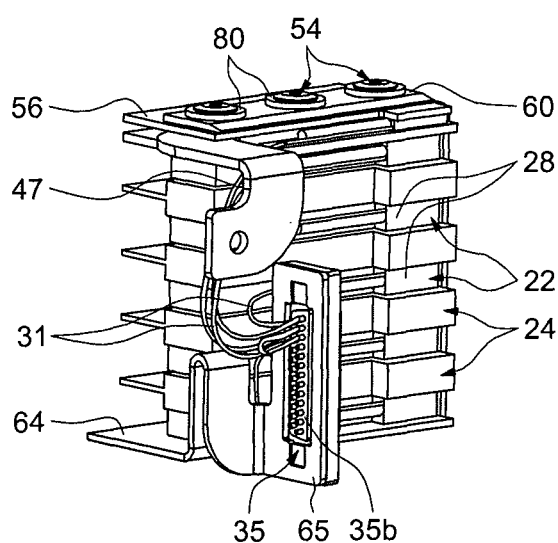

As illustrated in FIGS. 3 and 4, opposite the end linked to the connecting plug connected to the associated spacer 22, each electric cable 31 is fixed to a common connector 35. The connector 35 comprises a fixing body 35a, a first male connecting area 35b comprising contact pins for fixing the electric cables 31, and a second opposite female connecting area 35c to which a printed circuit board (not represented) can advantageously be directly connected to perform voltage measurements. The connecting areas 35b, 35c extend on either side of the body 35a and are electrically connected. The connector 35 may, for example, be a SUB-D connector.

Referring once again to FIGS. 1 and 2, the spacers 24 comprise first and second subgroups of insulating spacers 24a, 24b. The insulating spacers 24a are identical and take the form of thin rectangular plates. There are two of them. The lower surface of one of these spacers 24a is mounted indirectly against the upper face of the negative electrode 20 of the lower accumulator element 12 of the stack, as will be described below. The upper surface of this spacer is mounted in contact against the lower face of the positive electrode 18 of the accumulator element situated axially above. The spacer 24 provides electrical insulation for these two electrodes. The other spacer 24a bears against the lower face of the positive electrode 18 of the upper accumulator element 12 of the stack and the upper face of the negative electrode 20 of the accumulator element 12 situated axially below.

The spacers 24b are mounted axially between the negative electrode 20 of an accumulator element and the positive electrode 18 of the upper adjacent accumulator element for the accumulator elements 12 arranged axially between the lower and upper accumulator elements of the stack.

The spacers 24b are identical to one another and each comprise a base 32 taking the form of a rectangular plate which makes possible electrical insulation for the electrodes 20, 18 of the axially superposed accumulator elements 12. The base 32 is dimensioned so as to mostly cover the faces of the electrodes 20 and 18, a front face 32a of said base being substantially axially flush with the front free edge of the electrodes. The front face 32a of the base 32 is partly extended by a heel 34 extending to protrude relative to the front free edge of the electrodes, and more generally beyond the conductive spacers 22. The heels 34 are axially aligned with the heels 28 of the conductive spacers 22. The heels 34 make it possible to provide electrical insulation for the accumulator assembly 10 relative to an accommodating housing (not represented) of the accumulator assembly.

Each spacer 24b comprises a thin extension 36 extending from the rear face 32b of the base and designed to bear against one of the closure areas 16 of the accumulator elements associated with the spacer. This extension 36 makes it possible to avoid a contact between the negative 20 and positive 18 electrodes to be insulated of two adjacent accumulator elements, in the event of a possible deformation of one or both of these electrodes. In practice, since the electrodes 18, 20 are produced in the form of thin metallic sheets, they can be slightly folded and come into contact with the axially adjacent electrode, which can create a short circuit. The dependability of the accumulator assembly 10 is thus increased.

The arrangement of the first subgroup of spacers 24a relative to the electrodes 18, 20 and to the jackets 14 of the associated accumulator elements 12 is similar to that which has just been described for the second subgroup of spacers 24b.

In order to be able to electrically connect the assembly 10 to an electrical energy consumer, which may advantageously be the electric motor drive for the vehicle, upper 40 and lower 42 attachments are provided respectively for fixing power cables 44, 46. The upper attachment 40 is mounted to bear against the upper face of the positive electrode 18 of the upper accumulator element of the stack. The lower attachment 42 is mounted in contact with the upper face of the negative electrode 20 of the lower accumulator element of said stack and the corresponding spacer 24a. The spacer 24a is thus mounted indirectly in contact against said negative electrode 20. The attachments 40, 42 are made of an electrically conductive material.

The lower attachment 42 has a structure identical to that of the conductive spacers 22 but with a reduced thickness. One end of the power cable 46 is axially clamped between the attachment 42 and the corresponding spacer 24a. The upper attachment 40 also has a structure similar to the spacers 22 and also comprises an extension 40a to allow for the fixing of the power cable 44.

In a manner similar to the conductive spacers 22, the attachments 40, 42 comprise voids provided for mounting a connecting plug of an electric cable 47 which is identical to the cables 31. On the side opposite to the connecting plug, the electric cables 47 are fixed to the connector 35 at the connecting area 35b. They make it possible to perform a measurement of the total voltage at the terminals of the accumulator assembly 10. This measurement is performed between the positive electrode 18 of the upper accumulator element and the negative electrode 20 of the lower accumulator element of the stack.

The assembly 10 also comprises a plate 48 with a structure identical to that of the conductive spacers 22 and mounted axially bearing on the upper face of the negative electrode 20 of the upper accumulator element 12 of the stack. This plate 48 comprises a void provided for mounting a connecting plug of an electric cable 47. On the side opposite to the connecting plug, the cable 47 is fixed to the connector 35 in order to be able to perform a voltage measurement.

To ensure the fixing of the electrodes 18, 20 of the accumulator elements relative to the conductive 22 and insulating 24 spacers, the assembly 10 comprises upper 50 and lower 52 end flanges and assembly tie-rods 54 cooperating with the end flanges in order to axially clamp the spacers and connecting electrodes.

The upper end flange 50 comprises a first bearing plate 56 mounted axially in contact against the upper surface of the attachment 40 and extended perpendicularly at a lateral edge by a lug 56a extending axially downwards. The lug 56a has an axial dimension such that, in the assembled position of the accumulator elements 12, its lower end is situated axially below the positive electrode 18 of the lower accumulator element of the stack, substantially at the level of the lower end flange 52. The lug 56a extends in the vicinity of the electrodes 18, 20 and spacers 22, 24 stacked axially on the outside of the stack, i.e. on the side opposite to the other stack of electrodes and spacers. The lug 56a forms a protection or barrier that makes it possible to ensure the electrical insulation of the assembly 10 relative to its accommodating housing.

The end flange 50 also comprises a second bearing plate 58 which comes axially in contact against the upper surface of the plate 48, and backplates 60, 62 which respectively come axially into contact against the upper surfaces of the bearing plates 56, 58. A lateral edge of the bearing plate 58 is extended by an axial lug 58a symmetrical to the lug 56a considering an axial median plane of the accumulator elements 12. The lug 58a extends axially downwards and its lower end is situated axially at the level of the lower end flange 52 in the assembled position of the accumulator elements 12. The bearing plates 56, 58 are made of an insulating material.

The lower end flange 52 comprises first and second bearing plates 64, 66 which respectively come into contact against the lower faces of the positive 18 and negative 20 electrodes of the lower accumulator element 12 of the stack. The bearing plate 64 comprises an elastic support lug 65 provided for the fixing of the connector 35 to which the ends of the electric cables 31, 47 are fixed. The lug 65 comprises a through void to enable the mounting of the fixing body 35a of the connector, the connecting areas 35b and 35c extending on either side of said lug. A lateral edge of the bearing plate 66 is extended by an axial lug 67 extending upwards through the transversal space situated between the two axial stacks of connecting electrodes 18, 20 and spacers 22, 24. The upper end of the axial lug 67 is situated axially at the level of the bearing plate 58 of the upper end flange 50 in the assembled position of the accumulator elements 12.

The end flange 52 also comprises backplates 68, 69 which respectively bear against the lower surfaces of the bearing plates 64, 66.

The assembly tie-rods 54 pass axially through the stack of electrodes 18, 20 and spacers 22, 24 to clamp them axially between the end flanges 50, 52. To enable the assembly tie rods 54 to be mounted, the connecting electrodes 18 and 20, the spacers 22 and 24, the attachments 40 and 42, the plate 48, the bearing plates 56, 58, 64, 66 and the backplates 60, 62, 68, 69 comprise axially aligned through voids. In the exemplary embodiment illustrated, three voids are provided for each of these members.

The assembly tie-rods 54 are identical to one another and there are six of them. Each tie-rod 54 comprises a male part comprising a threaded rod 70, extending axially and provided, at its upper end, with a clamping head 72 comprising a hole that is tapped so as to allow for the insertion of a wrench for the purpose of screwing. Each tie-rod 54 also comprises a female part comprising a cylindrical mounting portion 74 provided internally with a threading corresponding to that of the rod 70. The lower end of the mounting part 74 comprises a bearing head 76 which comes into contact against the corresponding backplate 68, 69 of the lower end flange 52. The screwing of the threaded rods 70 into the mounting portions 74 enables the end flanges 50, 52 to axially clamp the insulating spacers 22, 24 and the electrodes 18, 20 and to obtain an axial contact between them in order to produce the electrical connection of the stacked accumulator elements 12.

Insulating sleeves 78 are provided for mounting the threaded rods 70 and the mounting portions 74 inside the voids formed on the connecting electrodes 18 and 20, the spacers 22 and 24, the plate 48, the attachments 40 and 42, the bearing plates 56, 58, 64, 66 and the associated backplates. The insulating sleeves 78 are inserted between the assembly tie-rods 54 and these voids in order to electrically insulate the tie-rods. To this end, the sleeves 78 are made of an electrically insulating material, for example silicone.

In order to ensure that the axial contact is maintained between the electrodes 18, 20 of the accumulator elements and the spacers 22 and 24, the assembly 10 comprises prestressing means 80 each arranged around one of the rods 70 of the assembly tie-rods 54 and mounted axially in contact with the associated clamping head 72 and the corresponding backplate 60, 62 of the end flange 50. The prestressing means 80 are identical to one another and each take the form of an angular washer with a rectangular section in the free state. The washers may, for example, be Belleville or plate-type washers. Alternatively, it is possible to use any other elastic prestressing means with axial elasticity suitable for exerting an axial prestressing force.

After the assembly tie-rods 54 have been tightened, the prestressing means 80 can exert axial forces on the upper end flange 50 so as to apply an axial prestress on the electrodes 18, 20 of the accumulator elements and the spacers 22, 24. A zero axial play is thus ensured between the two axial stacks of electrodes 18, 20 and of connecting spacers, guaranteeing a good electrical connection for the various accumulator elements 12. Furthermore, the prestressing means 80 make it possible to apply, between the electrodes 18, 20 and the spacers 22, 24, a contact pressure that is generally uniform over time.

The assembly 10 also advantageously comprises probes for measuring the temperature of the accumulator elements 12. A first probe 82 is fixed to the upper face of the upper accumulator element of the stack, a second probe being able to be fixed to an accumulator element situated, for example, at mid-height of the stack. The measuring probes can be fixed by gluing. The probes are linked to the connector 35 by cables (not represented) so as to be able to monitor the temperature of the assembly 10.

In order to individually insulate the accumulator elements 12 relative to one another, an insulating strip (not represented)

is provided on the various accumulator elements 12. To keep the accumulator elements 12 fixed relative to one another, clamping collars 84 are provided around the stack of accumulator elements 12. Two strips 86 of foam are also glued onto the portion of insulating strip covering the upper face of the upper accumulator element 12 of the stack.

As indicated previously, the conductive spacers 22 on the one hand, and the attachments 40, 42 as well as the plate 48 on the other hand, are respectively linked, by the electric cables 31 and 47, to the connector 35 in order to perform voltage measurements on the printed circuit board connected to said connector.

The total voltage at the terminals of the accumulator assembly 10 is obtained via the connection of the electric cables 47 to the conductive attachments 40, 42 which are respectively in contact with the positive electrode 18 of the upper accumulator element and the negative electrode 20 of the lower accumulator element of the stack. The printed circuit board also measures the voltage of each accumulator element 12 via the electric cables 31 connected to all the conductive spacers 22 and the cables 47 connected to the attachments 40, 42 and the plate 48. The printed circuit board makes it possible to monitor the voltages of all the accumulator elements 12 so as to ensure correct operation of the assembly 10.

In a charging phase for the assembly 10, the printed circuit board can detect when the charging is finished based on the measured voltages. The charging is considered to be finished when the total voltage at the terminals of the assembly 10 or the voltage of one of the accumulator elements 12 has reached the desired maximum voltage. Then, the printed circuit board orders an equalizing of the voltages of the accumulator elements 12 by sampling a discharge current on the most charged accumulator elements 12, via the electric cables 31 and/or 41 which are electrically connected to the relevant accumulator elements via the spacers 22 and/or the attachments 42 and/or the plate 42. At the end of the charging cycle, the printed circuit board orders an equalizing of the voltages of the accumulator elements 12.

The protective fuses 37 provided on each of the electric cables 31, 47 make it possible to avoid a possible short circuit of the assembly 10 if the current passing through these cables is above a predetermined threshold beyond which the fuse is blown. This makes it possible to avoid starting a fire in the assembly 10.

Moreover, in certain vehicle running conditions, the vibrations to which the accumulator assembly 10 is subject may be relatively great. If the mechanical link between one or more electric cables 31, 47 and the connector 35 has been badly made during assembly, the end of this or these electric cables may become separated from the connector and, for example, come against one of the accumulator elements 12 or against the accommodating housing in which the accumulator assembly is mounted. The protective fuses 37 also make it possible in this case to avoid a possible short circuit within the accumulator assembly.

In the exemplary embodiment illustrated, the negative electrode 20 of the upper accumulator element 12 comes directly into contact with the positive electrode 18 of the adjacent lower accumulator element. For the other axially superposed connecting electrodes 18, 20, a conductive or insulating spacer is inserted between two immediately successive electrodes. It could, however, be possible, without departing from the context of the present invention, to provide a direct axial contact between other axially superposed negative and positive electrodes of two successive accumulator elements by, in this case, mounting a conductive spacer 22 against the upper face of the positive electrode so as to be able to perform a voltage measurement, and by inserting an insulating spacer 24 between the conductive spacer and the negative electrode of the adjacent accumulator element 12 above the two accumulator elements concerned to maintain the desired electrical connection of the accumulator elements 12.

The invention claimed is:

1. An accumulator assembly comprising:
    a plurality of electrical energy accumulator elements superposed on a stacking axis, each of the electrical energy accumulator elements comprising connecting electrodes,
    at least one electrically conductive spacer formed from an electrically conductive material, said at least one electrically conductive spacer being arranged axially between said connecting electrodes of two adjacent accumulator elements and being axially in contact with said connecting electrodes, and said at least one electrically conductive spacer being electrically linked to at least one of said plurality of electrical energy accumulator elements,
    assembly tie-rods extending axially through mounting voids in said at least one electrically conductive spacer and in said connecting electrodes of the accumulator elements, said mounting voids extending axially relative to stack stacking axis, and
    at least one connecting plug comprising a conductive terminal part housed inside a connecting void of said at least one electrically conductive spacer and linked to an electric cable for a voltage measurement, said connecting void extending transversely relative to said stacking axis and to said mounting voids.

2. The accumulator assembly of claim 1, further comprising a short-circuit protection means electrically linked to said connecting plug.

3. The accumulator assembly of claim 2, wherein said short-circuit protection means is mounted on said electric cable.

4. The accumulator assembly of claim 2, wherein said short-circuit protection means comprises a fuse.

5. An accumulator assembly comprising:
    a plurality of electrical energy accumulator elements superposed on a stacking axis, each of said plurality of electrical energy accumulator elements comprising connecting electrodes,
    at least one electrically conductive spacer formed from an electrically conductive material, said at least one electrically conductive spacer being arranged axially between said connecting electrodes of two adjacent accumulator elements and being axially in contact with said connecting electrodes, and said at least one electrically conductive spacer being electrically linked to at least one of said plurality of electrical energy accumulator elements, and
    at least one connecting plug mounted inside a void of said at least one electrically conductive spacer and linked to an electric cable for a voltage measurement,
    wherein said at least one conductive spacer comprises a base against which bears at least one connecting electrode of said two axially adjacent accumulator elements, and a heel extending to protrude relative to said base and on which is formed said void.

6. The accumulator assembly of claim 5, wherein said connecting void extends transversely relative to said stacking axis of said plurality of electrical energy accumulator elements by being parallel to a front face of said base.

7. The accumulator assembly of claim 1, wherein said at least one connecting plug is elastically deformable.

8. The accumulator assembly of claim 1, further comprising a connector to which is fixed an end of said electric cable linked to said at least one connecting plug.

9. The accumulator assembly of claim 1, further comprising a plurality of electrically conductive spacers arranged axially between at least some of said connecting electrodes of said plurality of electrical energy accumulator elements, and a plurality of connecting plugs each mounted inside said connecting void of the associated conductive spacer and each linked to a specific electric cable.

10. The accumulator assembly of claim 9, wherein each said specific electric cable comprises a short-circuit protection means.

11. The accumulator assembly of claim 1, wherein said plurality of electrical energy accumulator elements is mounted in such a way as to alternately arrange the positive and negative of said connecting electrodes along said stacking axis so that a positive electrode of one electrical energy accumulator element is axially adjacent to a negative electrode of an adjacent electrical energy accumulator element, said at least one electrically conductive spacer and corresponding at least one insulating spacer being arranged to connect said plurality of electrical energy accumulator elements in series.

12. The accumulator assembly of claim 1, wherein each of said plurality of electrical energy accumulator elements further comprises an outer encapsulation jacket inside which are arranged a cathode and an anode that are separated by an electrolyte, and wherein each of said connecting electrodes extends from said encapsulation jacket.

13. The accumulator assembly of claim 12, wherein each of said plurality of electrical energy accumulator elements takes a form of a rectangular plate.

14. The accumulator assembly of claim 1, wherein said at least one conductive spacer comprises a base against which bears at least one connecting electrode of said two axially adjacent accumulator elements, and a heel extending to protrude relative to said base and on which is formed said connecting void.

15. The accumulator assembly of claim 14, wherein said connecting void extends transversely relative to said stacking axis of said plurality of electrical energy accumulator elements by being parallel to a front face of said base.

\* \* \* \* \*